United States Patent [19]
Hansen

[11] 3,783,692
[45] Jan. 8, 1974

[54] RESISTANCE BULB COMPENSATION CIRCUITS

[75] Inventor: Peter D. Hansen, Wellesley Hills, Mass.

[73] Assignee: The Foxboro Company, Foxboro, Mass.

[22] Filed: Apr. 6, 1972

[21] Appl. No.: 241,547

[52] U.S. Cl. .......................... 73/362 AR, 323/75 N
[51] Int. Cl. ............................................ G01k 7/20
[58] Field of Search .............. 73/362 AR; 323/75 H, 323/75 N

[56] References Cited
UNITED STATES PATENTS

| 3,651,696 | 3/1972 | Rose | 73/362 AR |
| 3,688,581 | 9/1972 | LeQuerner | 73/362 AR |
| 3,517,556 | 6/1970 | Barker | 73/362 AR |
| R27,103 | 3/1971 | Cate | 323/75 H X |

OTHER PUBLICATIONS

Oswald, R. K., Thermistor Temperature to Current Transducer, in IBM Technical Disclosure Bulletin, Vol. 7, No. 12, May, 1965.

Primary Examiner—Richard C. Queisser
Assistant Examiner—Frederick Shoon
Attorney—Norman E. Brunell

[57] ABSTRACT

Bridge circuits for three wire resistance bulbs used for temperature measurements including compensation for line resistance and non-linearity of platinum type resistance bulbs.

9 Claims, 2 Drawing Figures

PATENTED JAN 8 1974          3,783,692

:

RESISTANCE BULB COMPENSATION CIRCUITS

BACKGROUND OF THE INVENTION

1. Field of the Invention

This invention relates to circuits used to measure temperatures by using a temperature sensitive element as one leg of a bridge circuit in order to produce a voltage proportional to the temperature. This invention relates especially to compensation networks added to bridge circuits to compensate for the non-linearities inherent in the sensing element and for the effects of lead resistance between the sensing element and the bridge circuitry.

2. Description of the Prior Art

It is accepted practice to use at least three lead wires to connect a resistance bulb to a remote bridge and amplifier to compensate for lead resistance. One lead may be in series with the bulb, another with the zeroing resistor, and the third lead in series with the source. If the zeroing resistance is equal to the bulb resistance, and the lead resistances are equal, the bridge may be balanced. In this way, the effects of changes in lead resistance are used to cancel one another.

Various configurations have been developed to compensate for the non-linearities of the different types of bulbs; but these past approaches suffer from inaccuracy, low reliability and complexity, all of which lead to increased cost and customer dissatisfaction.

SUMMARY OF THE INVENTION

The instant invention avoids these difficulties and provides circuitry for compensation of the described errors in the following manner. For platinum resistance bulbs that normally have a resistance linearity error of about 2 ½ percent of span, the current through the bulb is programmed to increase as the voltage drop increases. This is accomplished with an active circuit producing the effect of a negative shunt resistor. The relationship between voltage drop and temperature can then be made linear within 0.05 percent of span. This same current is used to compensate for the voltage drops across the leads and to make the current source within the bridge appear as a more nearly perfect source.

PREFERRED EMBODIMENTS OF THE INVENTION

FIG. 1

Figure 1:
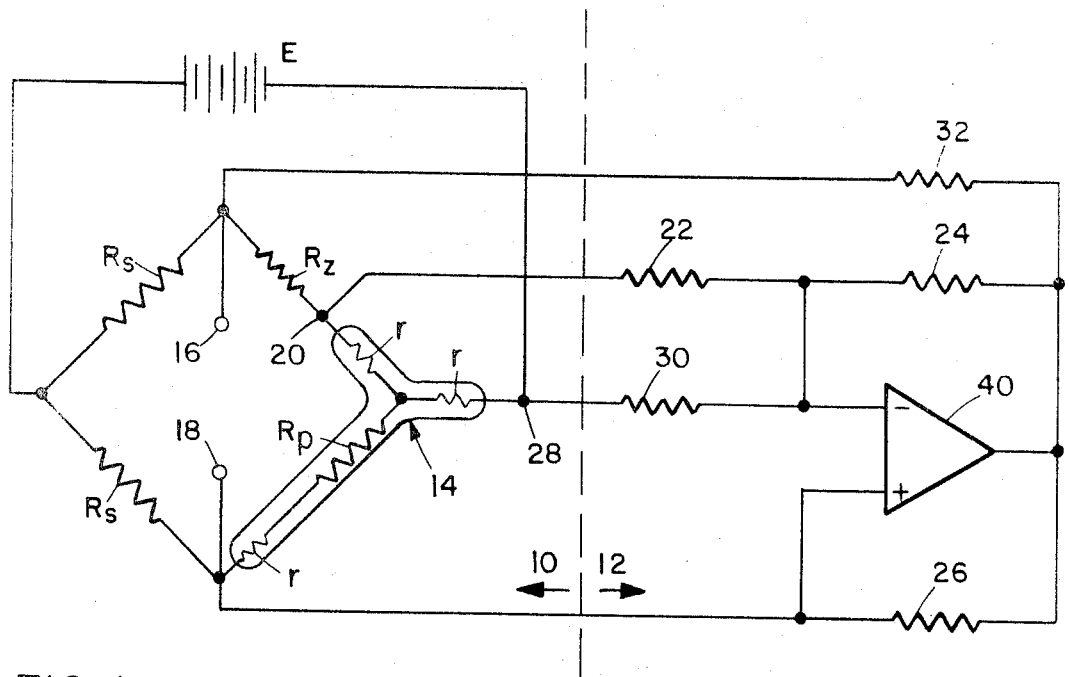
FIG. 1 is a bridge circuit for platinum resistance bulbs utilizing the instant invention.

FIG. 1 shows a circuit for developing a voltage related to the change in resistance in a resistance bulb due to change in temperature. This Figure is divided into two sections. Section 10 shows a bridge circuit utilizing a resistance bulb and Section 12 shows the corresponding compensation circuit for modifying the current through the platinum type resistance bulb in order to eliminate the effects of both the non-linearity of the bulb and the lead resistances.

The bridge circuit of Section 10 may be utilized without compensation to develop a voltage corresponding to temperature. The bridge is comprised of two fixed resistance legs of equal resistance, $R_S$, an adjustable zeroing resistance leg, $R_Z$, and a temperature sensitive resistance leg, $R_p$, whose resistance element is contained in resistance bulb 14. Bulb 14 is connected to the bridge through three leads. The effective resistance of each lead is shown as resistance $r$. One lead forms part of the resistance leg $R_p$. Another lead forms part of the resistance in resistance leg $R_Z$. The third lead is used to connect one side of the bridge to the excitation voltage source E at point 28. The other lead of source E is connected to the opposite side of the bridge. Because the fixed resistance legs are of equal and large value, $R_S$, and the lead resistances are of equal and small values, $r$, the bridge output voltage developed between points 16 and 18 ($E_{16}-E_{18}$) is virtually equal to the difference in voltage drops across resistances $R_p$ and $R_Z$. The output voltage is given by the equation:

$$E_{16}-E_{18} = [R_S (R_p-R_Z)/(R_S+R_p+R_p+r)(R_S+R_Z+r)] E$$

Because lead resistance $r$ forms part of each leg, its effect when the bridge is balanced cancel. The bridge output voltage ($E_{16}-E_{18}$) is, therefore, proportional to resistance $R_p$ and hence will be non-linear with respect to temperature.

Nearly equal currents flow through legs $R_Z$ and $R_p$. The voltage developed between points 18 and 20 is very nearly equal to the voltage drop across the temperature sensitive resistance element $R_p$ because the drops across the two lead resistances are of opposite polarity and cancel. This voltage ($E_{18}-E_{20}$) is used to program additional current into point 18 from the compensation circuit of section 12 to compensate for the non-linear temperature coefficient of the resistance bulb and for the reduction of current with increased temperature due to the lead resistances.

The voltage $E_{18}-E_{20}$ is detected by connecting resistor 22 between point 20 and the negative input of high gain operational amplifier 40, the positive input of which is connected to point 18. The current through this resistor ($E_{18}-E_{20}/R_{22}$) is, therefore, related to the voltage drop across the bulb. The same current must also flow through the negative feedback resistor 24.

Because the voltage drop across the positive feedback resistor 26 is equal to the drop across the negative feedback resistor 24, the current through resistor 26 is equal to the current through resistor 22 multiplied by the ratio $R_{24}/R_{26}$. This current is supplied to the resistance bulb through point 18.

In order to maintain the currents through the bridge legs $R_Z$ and $R_p$ nearly equal, resistor 32 is connected from the output of amplifier 40 to point 16. Because resistors 26 and 32 are equal in value and relatively large, the additional programmed current supplied to the bulb is also supplied to the zeroing resistor $R_Z$.

An additional non-linearity appears because the current through $R_S$ is not independent of temperature but depends partly upon the voltage drop across bulb 14. The current through $R_S$ is equal to $[E/R_S - (E_{18}-E_{28})/R_S.]$ To compensate for this it is necessary to add an additional component of current into point 18 equal to $E_{18}-E_{20}/R_S$ through resistor 26. This is accomplished by adding resistor 30 between point 28 and the negative input of amplifier 40. The current through resistor 30 causes a proportional additional component of current to flow through resistor 26. This component of current can be made equal to the desired value by adjusting resistor 30.

If the resistors are selected so that $$R_{30} = R_S \, R_{24}/R_{26},$$

$$R_{22} = R_N \, R_{24}/R_{26}, \text{ and}$$

$R_{32} = R_{36} =$ large value of resistance then the output voltage is given by the equation $$E_{16} - E_{18} = \frac{R_p - R_z}{\left(1 - \frac{R_p}{R_N}\right) R_S + \left(1 + \frac{R_S}{R_{32}}\right)(R_z + r)} E$$

where $R_N$ is the value of the effective negative resistance shunting the resistance bulb.

FIG. 2

Figure 2:
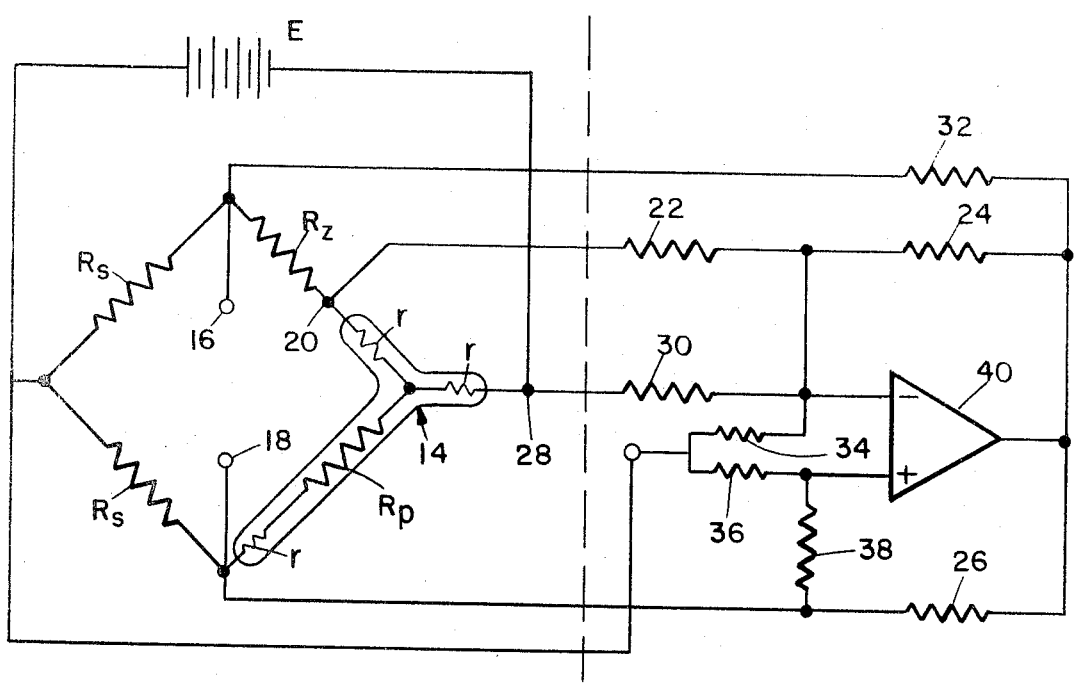
FIG. 2 is a modification of the circuit shown in FIG. 1 that allows the operational amplifier to be powered by the reference supply thus eliminating the need for a negative supply voltage.

For certain applications, such as field mounted equipment, it is advantageous to power the amplifier from the reference supply thereby eliminating the need for a separate negative supply voltage. In order to do this it is necessary to arrange that both the input common mode voltage and the amplifier output voltage between the supply voltages. This may be done by adding the three additional resistors shown in FIG. 2.

Two resistors of equal value, 34 and 36, are connected in series between the positive and negative inputs of amplifier 40. The center tap of the combination is connected to one end of source $E$. Resistor 38 is added between the positive input and point 18 to allow amplifier 40 to reject the common mode voltage applied to its inputs by resistors 34 and 36.

The values of these resistors may be chosen by the following equation:

$$1/R_{38} = 1/R_{30} + 1/R_{22} + 1/R_{24}.$$

Although preferred embodiments of the invention have been shown, it is obvious that certain modifications of this circuitry may be made to suit particular applications without departing from the scope or spirit of the invention.

I claim:

1. An improved temperature detecting device of the type normally having:
    a bridge circuit containing a temperature sensing element, having three sensor leads, with a known temperature coefficient of resistance for developing a voltage related to temperature, wherein the improvement comprises:
    means to detect the voltage drop across the sensing element connected to two of the sensor leads; and
    compensation means for supplying an additional component of current through the sensing element in response to the detecting means to compensate for non-linearities of the temperature coefficient.

2. The improved temperature detecting device of claim 1 wherein the bridge circuit further contains source resistors for supplying a nearly constant current to the sensing element, wherein the improvement further comprises:
    second compensation means for supplying a second additional component of current to the sensing element to compensate for the non-constant source current.

3. The improved temperature detecting device of claim 1 wherein the improvement further comprises:
    balancing means for supplying a balance current to the bridge equal to the components of current supplied to the sensing element for compensation.

4. A linear temperature measuring circuit comprising:
    a temperature sensing element;
    a first lead connected to a first end of the element;
    a second lead connected to a second end of the element;
    a third lead connected to a second end of the element;
    a zeroing resistance in series with the second lead forming one half of a bridge circuit, the ends of the series combination being the output of the bridge;
    a first fixed resistance;
    a second fixed resistance in series with the first, this fixed resistance series combination being connected across the output to form the second half of the bridge;
    a source of excitation voltage connected from the third lead to the common point between the first and second fixed resistances; and
    a compensation network for detecting the voltage drop across the sensing element and supplying additional current to the first lead to compensate for any non-linearity between voltage drop and temperature in the temperature sensing element.

5. The temperature measuring circuit of claim 4 wherein the compensation network comprises:
    an operational amplifier having its positive input connected to the first lead;
    a first input resistor connected between the negative input of the amplifier and the second lead;
    a negative feedback resistor connected between the negative input of the amplifier and the output thereof; and
    a positive feedback resistor connected between the output of the amplifier and the first lead to supply a compensating current to the temperature sensing element.

6. The temperature measuring circuit of claim 5 wherein the compensation network further comprises:
    a second positive feedback resistor connected between the output of the amplifier and the end of the zeroing resistance connected to the bridge output, equal in value to the first positive feedback resistor in order to supply a second compensating current to the bridge to prevent unbalance.

7. The temperature measuring circuit of claim 6 wherein the compensation network further comprises:
    a second input resistor connected between the negative input of the amplifier and the third lead to compensate for source impedance.

8. The temperature measuring circuit of claim 7 wherein the compensation network further comprises:
    a first biasing resistor connected from the negative input of the amplifier to the common point between the fixed resistances;
    a second biasing resistor connected between the positive input of the amplifier and the common point between the fixed resistances; and
    a third biasing resistor inserted between the positive input and the first lead, whereby the amplifier may be powered by the source of excitation voltage.

9. The temperature measuring circuit of claim 7 wherein the temperature sensing element is a platinum resistance bulb.

* * * * *